(12) United States Patent
Austin et al.

(10) Patent No.: US 7,212,498 B2
(45) Date of Patent: May 1, 2007

(54) MEASUREMENT OF QUALITY OF SERVICE

(75) Inventors: Phillip G. Austin, Fountain Hills, AZ (US); Vivaik Balasubrawmanian, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1110 days.

(21) Appl. No.: 10/125,913

(22) Filed: Apr. 18, 2002

(65) Prior Publication Data

US 2002/0184645 A1 Dec. 5, 2002

Related U.S. Application Data

(63) Continuation-in-part of application No. 09/870,366, filed on May 30, 2001, now Pat. No. 7,020,093.

(51) Int. Cl.
 H04L 12/56 (2006.01)
 G06F 15/16 (2006.01)
 H04N 11/04 (2006.01)

(52) U.S. Cl. .................. 370/252; 370/249; 370/395.21; 709/231; 348/404.1

(58) Field of Classification Search ........ 370/241–252, 370/395.2–395.21, 400–101; 709/231; 348/400–425
See application file for complete search history.

(56) References Cited

U.S. PATENT DOCUMENTS

| | | | |
|---|---|---|---|
| 5,446,492 A * | 8/1995 | Wolf et al. .................. 348/192 |
| 5,768,527 A * | 6/1998 | Zhu et al. .................... 709/231 |
| 5,898,668 A | 4/1999 | Shaffer | |
| 5,903,558 A | 5/1999 | Jones et al. | |
| 5,912,701 A | 6/1999 | Morton, Jr. | |
| 6,085,252 A | 7/2000 | Zhu et al. | |
| 6,275,797 B1 | 8/2001 | Randic | |
| 6,360,271 B1 | 3/2002 | Schuster et al. | |
| 6,363,053 B1 | 3/2002 | Schuster et al. | |
| 6,570,849 B1 | 5/2003 | Skemer et al. | |
| 6,574,218 B1 * | 6/2003 | Cooklev ..................... 370/352 |
| 6,700,953 B1 | 3/2004 | Maurer et al. | |
| 6,701,342 B1 | 3/2004 | Bartz et al. | |
| 6,748,433 B1 | 6/2004 | Yaakov | |
| 7,020,093 B2 | 3/2006 | Sirivara et al. | |
| 7,061,920 B2 * | 6/2006 | Janko et al. ............. 370/395.5 |
| 2002/0150102 A1 | 10/2002 | Janko et al. | |
| 2002/0181408 A1 | 12/2002 | Sirivara et al. | |
| 2006/0072476 A1 | 4/2006 | Sirivara et al. | |

OTHER PUBLICATIONS

Zhu, Qin-Fan et al., "Circuits and Systems for Video Technology", *IEEE Transactions*, 3(3):248-258 (Jun. 1993).
Chung, Yon Jun et al., "Real-time streaming video with adaptive bandwidth control and DCT-based error concealment", *Circuits and Systems II: Analog and Digital Signal Processing, IEEE Transactions*, 46(7):951-956 (Jul. 1999).

* cited by examiner

*Primary Examiner*—Chi Pham
*Assistant Examiner*—Tri H. Phan
(74) *Attorney, Agent, or Firm*—Michael R. Barre

(57) ABSTRACT

A method of measuring quality of service includes receiving, from a content server, a transmission of a first media stream and comparing that first media stream with a second media stream that corresponds to the first media stream prior to transmission thereof. This comparison provides a basis for determining a quality of service of the transmission.

25 Claims, 2 Drawing Sheets

MEASUREMENT OF QUALITY OF SERVICE

RELATED APPLICATIONS

This application is a continuation-in-part of U.S. application Ser. No. 09/870,366 filed on May 30, 2001 now U.S. Pat. No. 7,020,093, the contents of which are herein incorporated by reference.

FIELD OF DISCLOSURE

This disclosure relates to measurement of quality of service.

BACKGROUND

In a content delivery system, a content-server transmits a media stream to a client over a communication channel. The content-server often transmits media streams at times during which the client system is unlikely to be in use. These media streams are saved in a mass-storage medium for later retrieval and viewing by an audience.

During transmission, transmission errors are introduced. These errors affect the viewability of the media stream. The extent of these errors is reflected in the "Quality of Service", or QOS, for that transmission. In many cases, a content-delivery system measures QOS during transmission of the media stream. If the measured QOS indicates excessive transmission errors, then the content-server re-transmits the media stream.

A conventional content delivery service measures its QOS by collecting network statistics and inferring, on the basis of those network statistics, how good the media stream would appear to the viewing audience.

DETAILED DESCRIPTION

Figure 1:
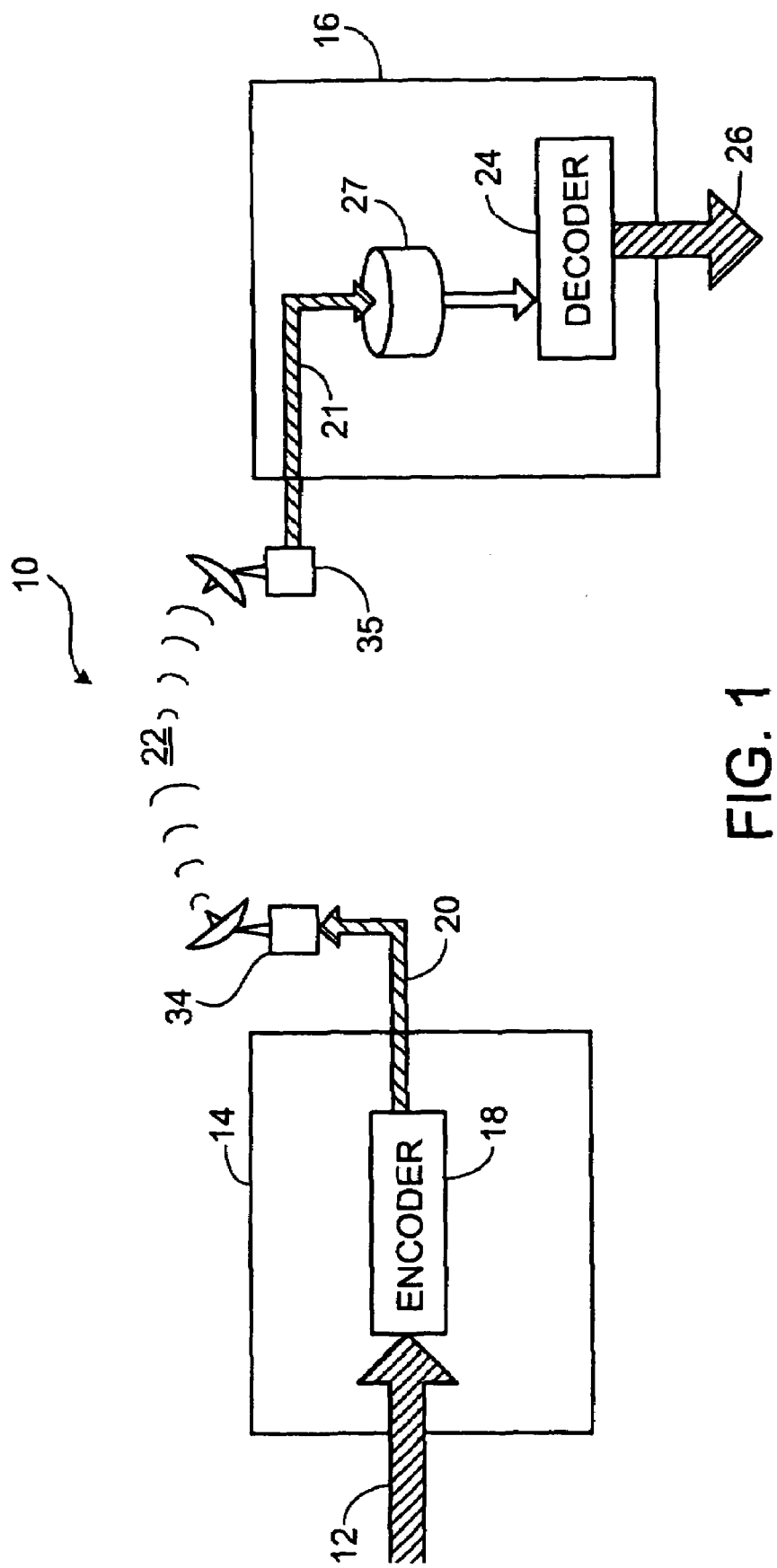
FIG. 1 shows a content delivery system.

As shown in the example of FIG. 1, a content delivery system 10 for the delivery of a media stream 12 from a content server 14 to a client 16 first reduces bandwidth needed for transmission by passing the media stream 12 through an encoder 18 executing on the content server 14. The encoder 18 transforms the media stream 12 into a compressed form, herein referred to as the "encoded media stream 20," suitable for transmission. The encoded media stream 20 then traverses a communication channel 22 until it reaches the client 16, whereupon it becomes a received encoded media stream 21. As shown in FIG. 1, the communication channel 22 is a wireless link between the client 16 and the content server 14. However, the communication channel 22 can also include a portion of a cable distribution network or a computer network. Examples of computer networks include WANs, LANs, private networks, and public networks such as the internet. This received encoded media stream 21 is stored on a storage device 27 for later viewing. In response to a request to view the media stream 26, or in response to a request for a QOS measurement, a decoder 24 executing on the client 16 retrieves the received encoded media stream 21 from the storage device 27 and transforms it into a decoded media stream 26.

In the content delivery system 10 of FIG. 1, there are at least two mechanisms that can impair the quality of the media stream. First, the encoder 18 and decoder 24 can introduce errors. For example, many encoding processes discard high-frequency components of an image in an effort to compress the media stream 12. As a result, the decoded media stream 26 may not be a replica of the original media stream 12. Second, errors can be introduced within the communication channel 22 itself. The nature of these errors depends on the type of communication channel. For example, in the case of satellite transmission, ionospheric conditions can degrade the received signal quality. Other mechanisms for introducing errors into the communication channel 22 include multipath reflection and dispersion.

These two impairment mechanisms, hereafter referred to as encoding error and transmission error, combine to affect the audience's subjective experience in viewing the media. However, the audience's subjective experience also depends on one other factor thus far not considered: the content of the media stream 12 itself.

In many cases, the extent to which a particular error affects an audience's enjoyment of a decoded media stream 26 depends on the content of the original media-stream 12. For example, a media stream 12 rich in detail will suffer considerably from loss of sharpness that results from discarding too many high frequency components. In contrast, the same loss of sharpness in a media stream 12 poor in detail, such as one having extensive night-time scenes, will most likely go unnoticed.

Figure 2:
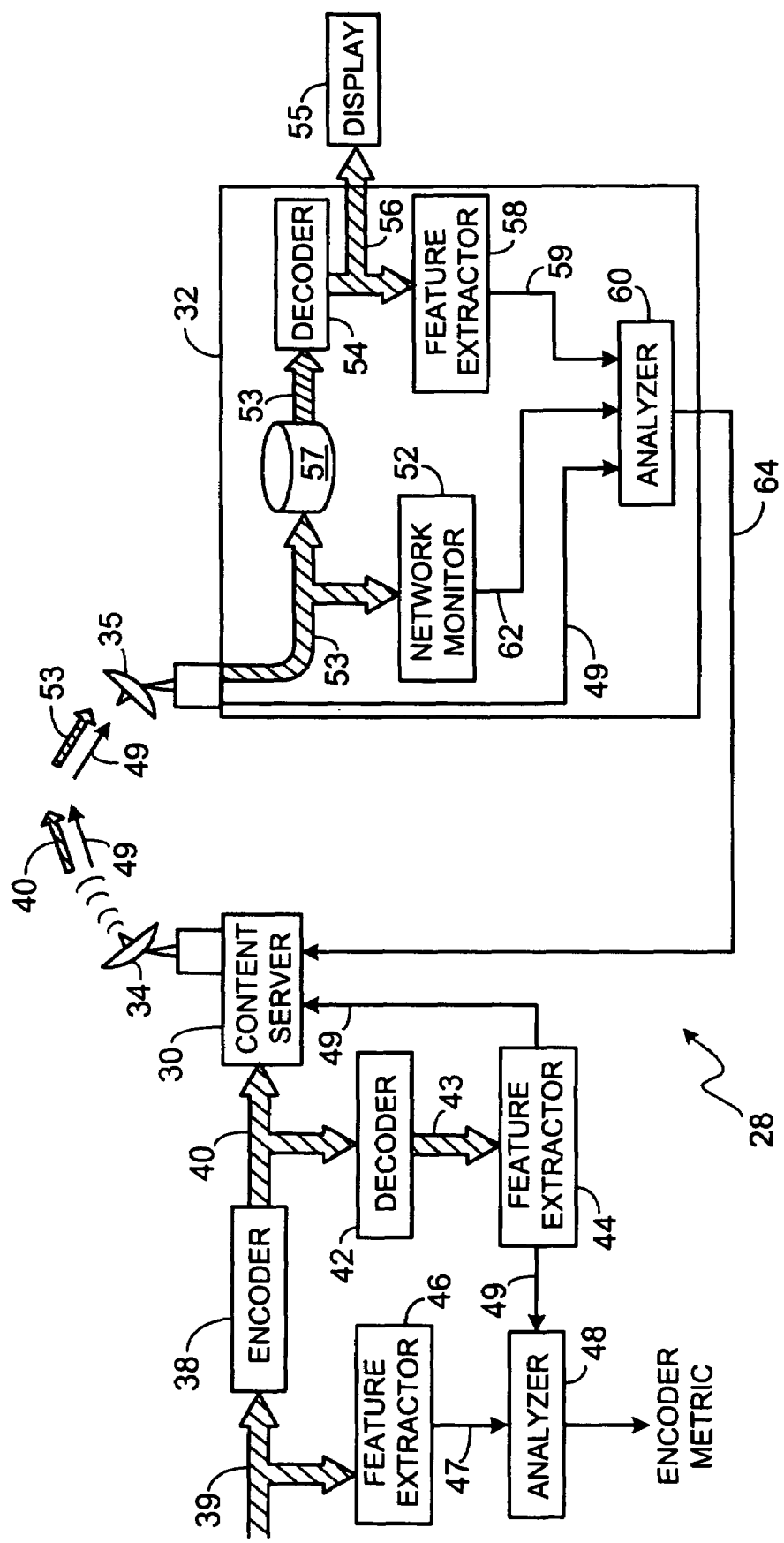
FIG. 2 shows the architecture of the content delivery system of FIG. 1.

Referring to FIG. 2, a system 28 for measurement of QOS includes a content server 30 in data communication with a client 32. Communication between the client 32 and the content server 30 can be over a satellite link, as shown in the figure. Alternatively, communication can be established over a cable network, a global computer network such as the internet, or any other data communication network.

An encoder 38 applies an encoding or compression algorithm to the original media stream 39, thereby generating an encoded media stream 40. This encoded media stream 40 is them provided to the content server 30 for transmission to the client 32. In most cases, particularly in the delivery of video programming, encoding is carried out in advance and the encoded media stream 40 is transmitted to the client 32 at an off-peak time, such as in the middle of the night, when the client 32 is unlikely to be in use by an audience. In such cases, the encoded media stream 40 is stored on a mass-storage system (not shown) associated with the content server 30 to await transmission.

A variety of encoding processes are available. In many cases, these encoding processes are lossy. For example, certain encoding processes will discard high-frequency components of an image under the assumption that, when the image is later decoded, the absence of those high-frequency components will not be apparent to the viewing audience. Whether this is indeed the case will depend in to part on the features of the image.

In addition to being transmitted to the client 32, the encoded media stream 40 at the output of the encoder 38 is also provided to the input of a first decoder 42. The first decoder 42 generates first decoder output 43 by recovering the original media stream to the extent that the possibly lossy encoding performed by the encoder 38 makes it possible to do so.

The first decoder output 43 is then provided to a first feature extractor 44. The first feature extractor 44 generates first feature data 49 by implementing known feature extraction algorithms for extracting temporal or spatial features of the encoded media stream 40. Known feature extraction methods include the Sarnoff JND ("Just Noticeable Difference") method and the methods disclosed in ANSI T1.801.03-1996 ("American National Standard for Telecommunications—Digital Transport of One Way Video Signals—Parameters for Objective Performance Specification") specification.

The original media stream 39 is also passed through a second feature extractor 46, that performs feature extraction like the first feature extractor 44, that generates second feature data 47. The first and second feature data 49, 47 are then compared by a first analyzer 48. This comparison results in the calculation of an encoding metric. As noted above, a media stream can be degraded through transmission errors and through encoding errors. The encoding metric provides a measure of how badly the media stream is degraded as a result of encoding errors alone.

An analyzer 48 compares features of two media streams. The output of the analyzer 48 is typically a dimensionless quantity that represents a normalized measure of how different the two media streams would appear to a viewer. In some practices of the invention, the analyzer 48 is configured to re-encode some or all of the original media stream 39 if the encoder metric indicates that the first and second feature data 49, 47 are too different from each other.

The first feature data 49 is also provided to the content server 30. The content server 30 transmits both the encoded media stream 40 and the first feature data 49 to the client 32 by way of the first antenna 34. The encoded media stream 40 and the first feature data 49 can be transmitted concurrently or at separate times.

As it propagates between the first antenna 34 and a second antenna 35 associated with the client 32, the encoded media stream 40 is subjected to the various difficulties that are commonly encountered on a communication channel. These difficulties are manifested as jitter, packet loss, and packet latency in the encoded media stream 40 received by the client 32. In one embodiment, statistics on these and other measures of transmission error are collected by a network performance monitor 52 located at the client 32 and made available to a second analyzer 60 located at the client 32.

The media stream received by the client 32, referred to herein as the "received encoded media stream 53, is then stored on a mass-storage device 57. In response to a request to view the media stream, a copy of the received encoded media stream 53 is provided to a second decoder 54. The output of the second decoder 54, referred to herein as the "second decoder output 56," is provided to a display 55 for viewing by an audience.

In some cases, transmission error significantly impairs the quality of the received encoded media stream 53. In cases in which the original media stream 39 is transmitted to the client 32 in advance of when it is viewed, there is an opportunity to correct this by re-transmitting some or all of the original media stream 39. For this opportunity to be taken advantage of, the client 32 must determine whether the received encoded media stream 53 has been significantly impaired.

In contrast to conventional systems, the client 32 does not simply examine network statistics during transmission to assess the impairment of the media stream. As noted above, whether the media stream is so impaired as to degrade the viewer's experience depends, to a great extent, on the content of the media stream. The client 32 instead compares first feature data 49 from the first feature extractor 44 with corresponding third feature data 59 extracted from the second decoder output 56 by a third feature extractor 58 that performs feature extraction like the first and second feature extractors 44, 46. The first and third feature data 49, 59 are then provided to the second analyzer 60 for comparison with each other.

Unlike the second decoder output 56 provided to the third feature extractor 58, the input to the first feature extractor 44 was never subjected to the vagaries of transmission. Hence, any difference between the first and third feature data 49, 59 is attributable to transmission errors alone. This difference is determined by the second analyzer 60 on the basis of a comparison between the first and third feature data 49, 59. On the basis of this difference, and optionally on the basis of network statistics 62 provided by the network monitor 52, the second analyzer 60 calculates a transmission metric 64 indicative of the extent to which the subjective perception of a viewing audience would be degraded by the transmission error alone. This transmission metric 64 can be sent back to the content server 30, either using the same channel that was used to transmit the encoded media stream 40, or through an alternate data communication channel, for example through a telephone line.

Upon receiving the transmission metric 64, the content server determines whether the QOS measured during transmission of the encoded media stream 40 is below a threshold. If the transmission metric 64 indicates that QOS during transmission was poor, the content server 30 re-transmits the encoded media stream 40. Otherwise, the content server 30 need do nothing further.

In an alternative embodiment, a decision to request retransmission on the media stream is made at the client 32 on the basis of the output of the second analyzer 60. In this case, the client 32 sends a signal back to the content server 30 to request re-transmission of the media stream. This further shifts the computational burden to the client 32 from the content server 30.

The client 32 thus provides an estimate of how a viewing audience is likely to perceive a second decoder output 56 derived from the received encoded media stream 53. If the received encoded media stream 53 proves to be excessively impaired, the client 32 requests re-transmission of the encoded media stream 40. In effect, the client 32 previews second decoder output 56 to determine whether it is of adequate quality to present to a viewing audience.

Instructions for carrying out the method described herein are typically stored on a machine-readable medium for execution by a processing element such as that found in digital computers, PDA's, and other devices that employ processing elements such as microprocessors and microcontrollers. Such devices can include electronic devices, optical devices, or combinations thereof.

We claim:

1. A method of measuring quality of service, said method comprising:
    receiving, at a client system, from a content-serving system, a transmission of a first media stream;
    deriving content features from the first media stream at the client system;
    receiving, at the client system, from the content-serving system, content features derived from a second media stream, the second media stream corresponding to the first media stream prior to transmission from the content-serving system;
    at the client system, comparing at least one of the content features derived from the first media stream with at least one of the content features derived from the second media stream; and determining a quality of service metric for the transmission, based at least in part on results of the comparison.

2. The method of claim 1, further comprising:
before comparing at least one of the content features derived from the first media stream with at least one of the content features derived from the second media stream, storing at least part of the media stream in non-volatile storage of the client system.

3. The method of claim 1, further comprising:
at the client system, determining whether quality of service is below a selected threshold; and
transmitting, to said content-serving system, a request for re-transmission of at least part of said first media stream, in response to a determination that quality of service is below the selected threshold.

4. The method of claim 1, further comprising transmitting, to said content-serving system, said quality of service metric.

5. The method of claim 1, wherein the operation of extracting content features from the first media stream comprises extracting at least one type of feature from the group consisting of:
a temporal media content feature; and
a spatial media content feature.

6. The method of claim 1, comprising:
extracting content features from the first media stream through use of an algorithm from the group consisting of a Sarnoff JND algorithm and an ANSI T1.801.03 algorithm.

7. The method of claim 1, further comprising:
obtaining network statistics associated with said transmission; and
incorporating said network statistics into a determination of said quality of service.

8. The method of claim 1, further providing a wireless link to said content-serving system.

9. A system comprising:
a client system to receive a first media stream from a content-serving system, to derive content features from the first media stream, and to receive, from the content-serving system, content features derived from a second media stream, the second media-stream corresponding to the first media stream prior to transmission from the content-serving system; and
an analyzer in said client system to compare at least one of the content features derived from the first media stream with at least one of the content features derived from the second media stream, and to determine a quality of service metric, based at least in part on results of the comparison.

10. The system of claim 9, wherein said client system is configured to request re-transmission of said first media stream when said analyzer indicates a quality of service below a defined threshold.

11. The system of claim 9, further comprising a network monitor in communication with said analyzer, said network monitor being configured to provide network statistics to said analyzer.

12. The system of claim 9, wherein said client system comprises a first feature extractor configured to derive the content features from said first media stream.

13. The system of claim 12, further comprising:
the content-serving system wherein said content-serving system comprises a second feature extractor configured to derive the content features from said second media stream.

14. The system of claim 12, wherein the first feature extractor is configured to derive the content features from the first media stream using an algorithm from the group consisting of:
a Sarnoff JND algorithm; and
an ANSI T1.801.03 algorithm.

15. The system of claim 9, wherein:
the content features received from the content-serving system by the client system comprise reference data that characterizes at least a portion of an image from the second media stream;
the content features to be derived from the first media stream by the client system comprise altered data that characterizes at least a portion of an image included in the first media stream after the first media stream has traversed a network; and
the analyzer compares the reference data with the altered data when determining the quality of service metric.

16. The system of claim 9, further comprising:
non-volatile storage in the client system, the non-volatile storage to store at least part of the first media stream before the analyzer compares at least one of the content features derived from the first media stream with at least one of the content features derived from the second media stream.

17. An apparatus comprising:
a computer-readable medium; and
instructions in the computer-readable medium, wherein the instructions, when executed by a client system, cause the client system to perform operations comprising:
receiving, from a content-serving system, a transmission of a first media stream;
deriving content features from the first media stream at the client system;
receiving, from the content-serving system, content features derived from a second media stream, the second media stream corresponding to the first media stream prior to transmission from the content-serving system;
comparing at least one of the content features derived from the first media stream with at least one of the content features derived from the second media stream; and
determining a quality of service metric for the transmission, based at least in part on results of the comparison.

18. The apparatus of claim 17, wherein said computer-readable medium comprises instructions which, when executed by the client system, cause the client system to store at least part of the first media stream on non-volatile storage in the client system before the client system compares at least one of the content features derived from the first media stream with at least one of the content features derived from the second media stream.

19. The apparatus of claim 17, wherein said computer-readable medium comprises instructions which, when executed by the client system, cause the client system to perform operations comprising:
determining whether quality of service is below a selected threshold; and
transmitting, to said content-serving system, a request for re-transmission of at least part of said first media stream, in response to a determination that quality of service is below the selected threshold.

20. The apparatus of claim 17, wherein said computer-readable medium comprises instructions which, when executed by the client system, cause the client system to perform operations comprising:

transmitting, to said content-serving system, said quality of service metric.

21. The apparatus of claim 17, wherein the computer-readable medium comprises instructions which, when executed by the client system, cause the client system to derive the content features from the first media stream through use of an algorithm from the group consisting of:
   a Sarnoff JND algorithm; and
   an ANSI T1.801.03 algorithm to said first media-stream.

22. The apparatus of claim 17, wherein the computer-readable medium comprises instructions which, when executed by the client system, cause the client system to perform operations comprising:
   obtaining network statistics associated with said transmission; and
   incorporating said network statistics into a determination of said quality of service.

23. A method comprising:
   deriving content features from a media stream at a content server;
   transmitting the media stream from the content server to a client system via a network;
   transmitting the content features derived from the media stream by the content server to the client system;
   receiving, at the content server, a quality of service metric from the client system, the quality of service metric measuring differences between (a) the content features derived from the media stream at the content server and (b) content features derived from the media stream at the client system after the media stream has traversed the network; and
   if the quality of service metric does not meet a predetermined threshold, retransmitting at least part of the second media stream to the client system.

24. A method according to claim 23, wherein the operation of deriving content features from the media stream comprises deriving at least one type of feature from the group consisting of:
   a temporal media content feature; and
   a spatial media content feature.

25. A method according to claim 23, comprising:
   extracting content features from the media stream through use of an algorithm from the group consisting of a Sarnoff JND algorithm and an ANSI T1.801.03 algorithm.

* * * * *